A. E. Baldwin,
Milk Strainer.

No. 93,582.          Patented Aug. 10, 1869.

Witnesses:
Henry J. Aretz
Wm. Cm. Intire

Inventor:
Anna E. Baldwin
by Alex. A. C. Klauckert &co.
Attorneys

United States Patent Office.

ANNA E. BALDWIN, OF NEWARK, NEW JERSEY.

Letters Patent No. 93,582, dated August 10, 1869.

IMPROVEMENT IN MILK-SEPARATORS.

The Schedule referred to in these Letters Patent and making part of the same.

*To all whom it may concern:*

Be it known that I, ANNA E. BALDWIN, of Newark, in the county of Essex, and State of New Jersey, have invented a new and useful Improvement in Milk-Separators; and I do hereby declare the following to be a full and correct description of the same, sufficient to enable others skilled in the class to which my invention appertains, to fully understand and use the same, reference being had to the accompanying drawings, which make part of this specification, and in which—

Like letters of reference indicate like parts in the several figures.

Figure 1:
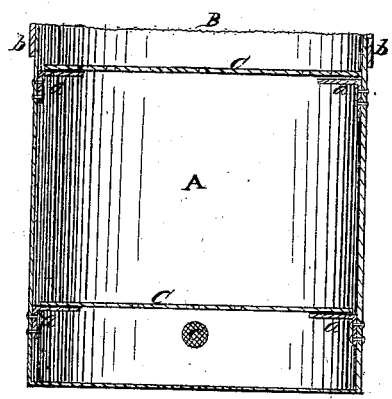
Figure 1 is a central vertical section of my improved milk-separator.
Figure 2:
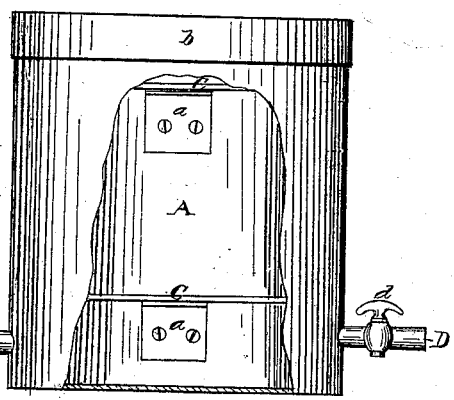
Figure 2 is a side elevation of the same, with part of the side broken out.
Figure 3:
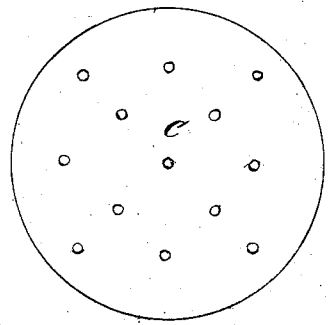
Figures 3 and 4 are plans of one of the shelves, and of the lid, respectively.
Figure 4:
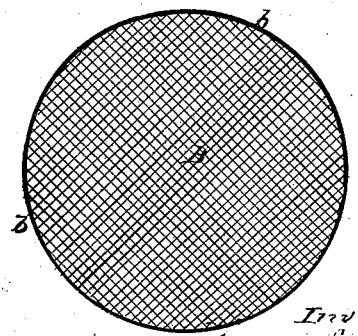

My invention consists in the construction of an apparatus for obtaining the whey from milk, which whey I use in the manufacture of vinegar, cordial, &c.

A, in the drawings, represents a vessel, of any desired shape or size, constructed of any suitable material, and provided with a lid, consisting of a rim, $b$, holding a top of gauze netting, B, of any suitable kind.

On the inside of this vessel, at opposite sides, are secured brackets, $a$, which support perforated shelves, C.

In the drawings, I have shown the vessel A as provided with two shelves, but three or more shelves may be used, as occasion may require.

The vessel A is provided with faucets, D, near the bottom, under the lowest shelf C, the inner ends of which are protected by gauze strainers, $c$, as shown in fig. 1.

These faucets have cocks $d$, the openings in which are also provided with gauze strainers, so that none of the curd can escape with the whey.

The object of my invention is to obtain the pure whey from the milk.

I place the shelves C on the brackets $a$, close the faucets D, and fill the vessel A with either sweet or sour milk, though milk in its raw state is preferable. The apparatus is then allowed to stand quiet while the milk curdles.

This process generally takes two or three days, by which time the curd has formed, and is supported on and between the shelves, while the whey, dripping from the top through the perforated shelves, collects at the bottom, from where it is drawn off through faucets D into vessels placed below them; the strainers $c$ and strainer-cocks $d$ preventing any curd from passing out with the whey.

The curd, which is an excellent food for poultry, is then removed, the shelves cleaned and replaced, and the apparatus is ready for another operation.

Having thus described my invention,

What I claim as new, and desire to secure by Letters Patent, is—

The milk-separating apparatus, consisting of the vessel A, provided with perforated removable shelves C, lid B $b$, and straining-faucets D $c$ $d$, all arranged to operate substantially as herein described.

ANNA E. BALDWIN.

Witnesses:
SOPHIA B. COREY,
JAMES F. BOND.